No. 844,767. PATENTED FEB. 19, 1907.
J. I. ARBOGAST.
METHOD OF PRODUCING WIRE GLASS.
APPLICATION FILED APR. 26, 1906.
2 SHEETS—SHEET 1.
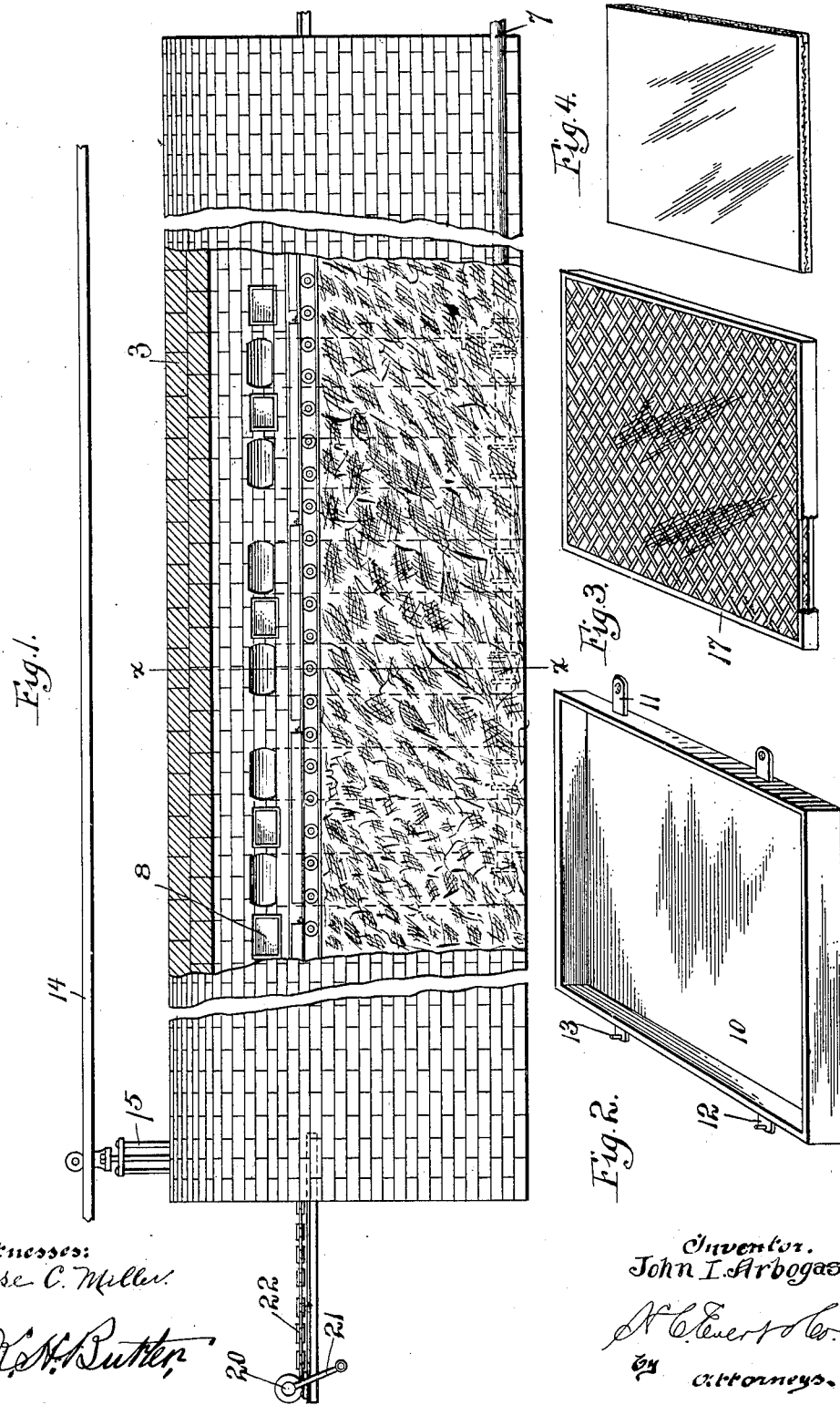

No. 844,767. PATENTED FEB. 19, 1907.
J. I. ARBOGAST.
METHOD OF PRODUCING WIRE GLASS.
APPLICATION FILED APR. 26, 1906.
2 SHEETS—SHEET 2.
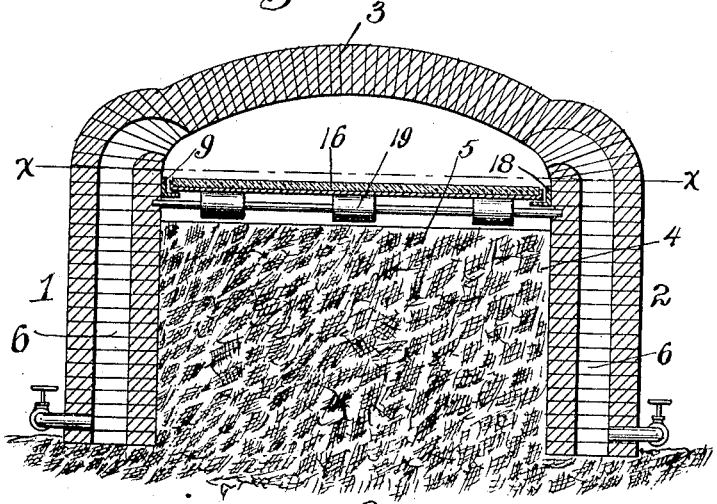
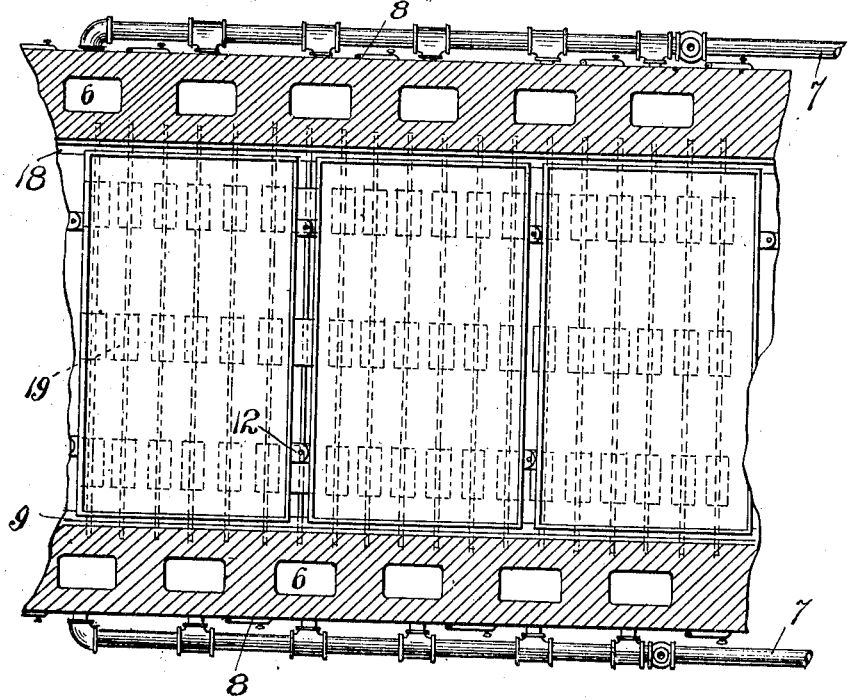
Witnesses:
Jesse C. Miller
Inventor.
John I. Arbogast.
by
Attorneys.

UNITED STATES PATENT OFFICE.

JOHN I. ARBOGAST, OF PITTSBURG, PENNSYLVANIA, ASSIGNOR OF ONE-HALF TO LEM S. BROCK, OF BEAVER, PENNSYLVANIA, AND SEVEN AND ONE-HALF ONE-HUNDREDTHS TO FRANK C. PARK, AND SEVEN AND ONE-HALF ONE-HUNDREDTHS TO HENRY L. COLLINS, BOTH OF PITTSBURG, PENNSYLVANIA.

METHOD OF PRODUCING WIRE-GLASS.

No. 844,767.  Specification of Letters Patent.  Patented Feb. 19, 1907.

Application filed April 26, 1906. Serial No. 313,741.

*To all whom it may concern:*

Be it known that I, JOHN I. ARBOGAST, a citizen of the United States of America, residing at Pittsburg, in the county of Allegheny and State of Pennsylvania, have invented certain new and useful Improvements in Methods of Producing Wire-Glass, of which the following is a specification, reference being had therein to the accompanying drawings.

The invention relates to methods of producing wire-glass or glass having a reinforcing element of wire mesh embedded therein.

Heretofore in the production of wire-glass it has been the practice to pour a layer of molten glass upon an iron table, then apply a section of wire mesh to the upper surface of said glass layer, and finally to pour a second layer of glass upon the section of wire mesh. The composite thus formed is then annealed in a suitable oven, and after cooling is ground and polished. This last-named steps in the process is laborious and expensive; and the primary object of the present invention is to provide a method which will entirely obviate the necessity of such grinding and polishing, and thus materially reduce the cost of production of wire-glass.

A further object of the invention is to provide a novel method of producing wire-glass by heating sheets of glass with an interposed layer of wire mesh or fabric in such a manner as to avoid all pressure upon the heated layers and to preserve the original polish of the glass, thereby avoiding the necessity for grinding and polishing the cooled product as a separate operation.

In carrying out my invention I utilize ordinary window-glass instead of molten glass, and the method consists of assembling two layers or sheets of glass with an interposed layer of wire mesh or netting, then subjecting said assembled layers to a gradually-increasing heat, then to an annealing heat to cause the glass sheets to collapse and amalgamate by their own weight, and finally subjecting the layers to a gradually-decreasing heat to insure a gradual cooling, and thus maintain the original polish of the glass in the completed product.

In connection with my improved method I employ an amalgamating and annealing oven of peculiar construction, as shown in the accompanying drawings, in which—

Figure 1 is a view, partly in side elevation and partly in longitudinal section. Fig. 2 is a view in perspective of one of a series of pans employed in connection with the oven. Fig. 3 is a perspective view showing two sections or layers of glass with an interposed layer of wire mesh as they appear previous to treatment within the oven. Fig. 4 is a perspective view of the completed product on a smaller scale than that shown in Fig. 3. Fig. 5 is a transverse vertical section of the oven, and Fig. 6 is a transverse horizontal section on the line *x x* of Fig. 5.

The reference-numerals 1 and 2 designate the opposite side walls of the furnace, and 3 the roof thereof. The space between the side walls 1 and 2 has a filling 4 of earth, the upper surface 5 of which constitutes the furnace-floor.

While of course the dimensions of the oven structure may be varied, I have found an oven approximately one hundred and ten feet in length is desirable, and the central portion of this structure, approximately twenty feet in length, I utilize as the working or heating chamber of the oven. A series of vertically-disposed flues 6 are provided on opposites sides of the oven, said flues having suitable connections with gas-supply pipes 7, located on opposite sides of the oven, as clearly shown in Figs. 5 and 6. At suitable intervals between the upper ends of the flues 6 I provide openings 8 to permit of the insertion into the working chamber of the oven of suitable flattening tools or rollers, if this is found desirable. These openings on opposite sides of the working chamber are arranged in staggered relation or out of vertical alinement, and each of said openings is provided with a suitable door or closure.

To the inner surface of each of the side walls 1 and 2 is secured an angle-plate 9, extending longitudinally throughout the length of the oven and oppositely arranged, as shown in Fig. 5, to serve as a support a trackway for a series of rectangular pans 10, adapted to contain the layers of glass and wire mesh. These pans are all similar in construction, and each is provided at one side with a pair of projecting perforated ears 11 and at its opposite side with a pair of projecting lugs 12, each of said lugs having an upwardly-extending pin 13, adapted to engage the perforated ears of the next adjacent pan.

Arranged above the oven and at one side thereof is a trackway 14, or what is technically known in the art as a "telegraph," from which is suspended a traveling fork or grapple 15, adapted to engage the pans after the latter are emptied and return them to the front end of the oven. Within each of the pans 10 is supported a flattening-stone 16, said stones being of a size to snugly fit within the pans, and upon each of said stones is loosely supported a rectangular frame 17, adapted to inclose the layers of glass and wire mesh and maintain them in their proper relative positions.

Below the angle-irons 9 I provide at suitable intervals apart a number of roller-shafts 18, said shafts being supported in suitable bearings in the side walls of the oven and carrying a plurality of rollers 19, over which the pans travel. At the rear end of the oven I provide a device for moving the chain of connected pans through the oven, the device here shown comprising a shaft 20, having a crank-handle 21 at one end thereof, a suitable chain 22 being wound upon the shaft 20 and adapted to engage the pins 13 of the outermost pan.

Wire-glass manufactured in accordance with my improved method is especially adapted for windows, tiling, and like purposes.

My improved method is distinguished from pressing two sheets of glass with an interposed wire between metallic plates while the glass is in a molten state. This pressure of the glass within a mold would not only destroy the polish of the glass, which it is the primary object of my method to preserve, but molten glass cooled within a mold or under pressure would inevitably produce cracks or "crizzles" in the cooled product, which would render the latter unmarketable.

My improved method is further distinguished from the mold-pressure method of treating glass above referred to by the fact that my method of heating the assembled layers of glass and wire mesh involves three distinct steps, viz: a gradual preliminary heating, an annealing heating, and a gradual cooling. These several steps are carried out in a single furnace, and they result in a product of superior quality free from crizzles and in which the polish of the glass is so maintained as to obviate the expensive after treatment of polishing and grinding, which renders the production of wire-glass by the process now in use so expensive.

An important characteristic of my improved method is that the individuality of the layers of glass is maintained throughout the heating and amalgamating treatment, the wire mesh maintaining its position between the layers the meeting surfaces of which are fused together.

What I claim as new, and desire to secure by Letters Patent, is—

1. The herein-described method of producing wire-glass consisting of placing a plate or sheet of glass within a suitable frame upon a flattening-stone to confine the glass and prevent spreading of the edges thereof, placing a section or layer of wire mesh or netting upon said plate or sheet of glass, superimposing a second plate or sheet of glass upon said mesh or netting, then passing the assembled layers of glass and netting through an amalgamating and annealing oven to fuse the meeting surfaces of the glass layers together without destroying the surface luster of the glass layers.

2. The herein-described method of producing wire-glass, consisting in subjecting two sheets of polished glass with a layer of wire mesh or netting between them to treatment within a furnace to amalgamate the sheets of glass and to preserve their original polish, consisting of first passing the assembled layers of glass and wire mesh by mechanical means through a chamber of the furnace to gradually heat the said layers to the fusing-point while maintaining their individuality and their transparent quality, then mechanically advancing the layers into a second chamber of the furnace to subject them to an annealing heat, and finally mechanically passing the layers through a third chamber of the furnace to gradually cool the same.

3. The method of making wire-glass, which consists in assembling two layers of glass with an interposed layer of wire mesh, then subjecting the assembled glass and wire mesh to a gradually-increasing temperature sufficient to fuse the glass together while retaining the individuality of the layers and their transparent quality, then subjecting the fused product to an annealing heat, and finally subjecting the product to a gradually-decreasing heat.

4. The herein-described method of making wire-glass, consisting in assembling two layers of glass with an interposed layer of wire mesh, then subjecting the glass and wire-mesh layers to a gradually-increasing heat sufficient to amalgamate the layers while retaining their individuality and original luster, and then subjecting the amalgamated product to an annealing heat.

In testimony whereof I affix my signature in the presence of two witnesses.

JOHN I. ARBOGAST.

Witnesses:
  H. C. Evert,
  E. E. Potter.